United States Patent [19]

Lesh et al.

[11] Patent Number: 4,918,825
[45] Date of Patent: Apr. 24, 1990

[54] MICROMETER CARTRIDGE HEADSPACE GAUGE

[76] Inventors: Stephen S. Lesh, 28459 Siesta La., Eugene, Oreg. 97402; Herman J. Waske, 2602 Sorrel Way, Eugene, Oreg. 97401

[21] Appl. No.: 299,477
[22] Filed: Jan. 23, 1989
[51] Int. Cl.$^5$ .............................................. G01B 5/00
[52] U.S. Cl. ...................................... 33/506; 33/822; 33/833; 42/1.07
[58] Field of Search ................. 33/813, 822, 833, 783, 33/506; 42/107

[56] References Cited

U.S. PATENT DOCUMENTS

| | | | |
|---|---|---|---|
| 2,142,405 | 1/1939 | Munson | 42/1.07 X |
| 2,342,703 | 2/1944 | Simpson | 42/1.07 X |
| 2,502,613 | 4/1950 | Zanolio | 33/833 |
| 2,544,158 | 3/1951 | Henderson | 33/506 |
| 2,553,704 | 5/1951 | Eckel | 33/506 |
| 2,645,160 | 7/1953 | Gilligan | 42/1.07 X |
| 4,174,575 | 11/1979 | Nakata | 33/813 X |
| 4,821,421 | 4/1989 | Girardier et al. | 33/813 |

Primary Examiner—Daniel M. Yasich
Attorney, Agent, or Firm—Richard C. Litman

[57] ABSTRACT

A firearm cartridge headspace gauge consisting of a threaded cylindrical barrel and threaded head is machined internally to precisely match the external dimensions of a given firearm cartridge. A scale is provided on the gauge barrel and mating head. When a cartridge is inserted into the barrel and the head is installed to the point at which the interior of the head contacts the cartridge, the scale may be read to determine any difference from the optimum headspace for that type and caliber of cartridge. Varous sizes of cartridge headspace gauges may be produced so as to conform precisely to the dimensions of any cartridge desired. The gauge provides a method of quickly and precisely checking the exact headspace of any cartridge, whereupon the cartridge may be resized as necessary after removal from the gauge.

3 Claims, 1 Drawing Sheet

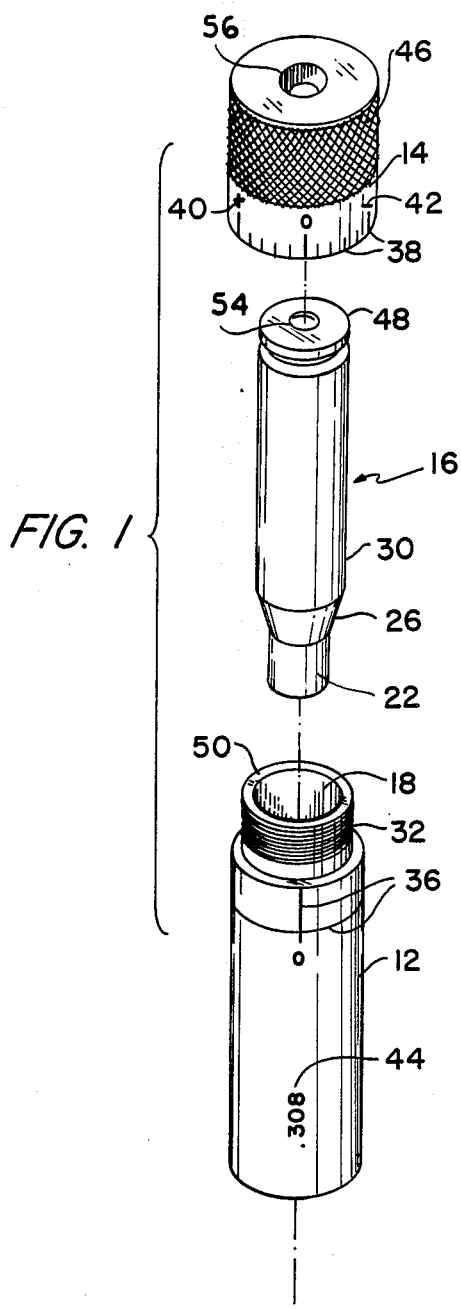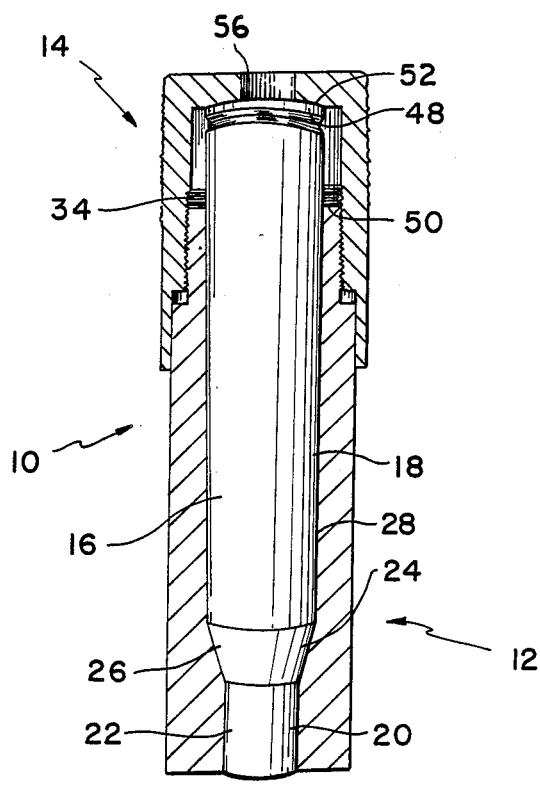
FIG. 1
FIG. 2

MICROMETER CARTRIDGE HEADSPACE GAUGE

FIELD OF THE INVENTION

This invention relates generally to the measurement of headspace in a firearm cartridge, and more specifically to a device providing accurate measurement of that headspace.

BACKGROUND OF THE INVENTION

Proper headspace in a firearm is of critical importance. This dimension relates to the distance between the aft end of the chamber of a firearm or cartridge contained within the chamber of that firearm, and the forward end of the bolt or other mechanism which serves to retain the cartridge within the firearm chamber. Headspace is properly measured when the bolt or mechanism is at its forwardmost travel and the chamber is closed.

When a firearm is fired, the cartridge will tend to expand to the limits of the available volume within the firearm chamber. If this volume is too great, as may be caused by too much headspace, the cartridge may burst, causing damage to the firearm or possible injury to the shooter. If headspace is too short, it may prove impossible to completely insert a cartridge into the chamber of the firearm and completely close and lock the bolt.

Obviously, the dimensions of the cartridge to be used in the firearm have a great bearing on the headspace, and properly manufactured new cartridges will precisely fit the firearm for which they were manufactured. However, many persons engaged in the firearms or shooting hobby reload their own previously fired cartridges for purposes of economy, special loads or bullets, etc. Such previously fired cartridges may be beyond proper tolerances for proper headspace, for a variety of reasons.

A cartridge may provide too little headspace if it has been expanded due to previous use. Such a cartridge may be resized, but if the resizing operation is not carried out precisely, it may lead to too much headspace and the potential problems associated with that situation. As can be seen, the exact determination of cartridge headspace is vital, but is difficult to measure directly. The need arises for a device which may easily and precisely determine the exact headspace of a given size of firearm cartridge.

DESCRIPTION OF THE RELATED ART

Some devices relating to cartridge headspace have been patented in the past. Most, however, are associated with the large volume manufacture of cartridges rather than the ammunition reloading hobbyist. Jacobsen U.S. Pat. No. 3,174,390 discloses a device for the trimming of cartridge cases. While this device provides for the trimming of cases, it provides no method of measuring the cases; this must be done byy a separate tool. Hlusko U.S. Pat. No. 4,510,842 discloses a device for resizing, particularly reducing, the diameter of a previously fired cartridge. Again, this device makes no provision for the measurement of cartridge headspace. Lowry U.S. Pat. No. D. 199,862 discloses a height gauge which appears to offer external means of height measurement, but which would not be applicable to the needs served by the present invention.

SUMMARY OF THE INVENTION

By the present invention, an improved device for the measurement of firearm cartridge headspace is disclosed.

Accordingly, one of the objects of the present invention is to provide a device capable of providing the precision required for such measurement.

Another object of the present invention is to provide a device which is specifically made for a given caliber and type of cartridge, but which may through minor dimensional variations be produced in a variety of sizes in order to accurately measure the headspace of any caliber and type of cartridge desired.

A further object of the present invention is to provide a device which is simple and easy to use and has relatively few components.

An additional object of the present invention is to provide a device capable of quantifying any differences from the optimum cartridge headspace by means of a vernier scale in the manner of a typical micrometer scale.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 1 is an exploded perspective view of the cartridge headspace gauge, disclosing the method by which a typical cartridge may be inserted into the device.

FIG. 2 is a sectioned side view of the assembled cartridge headspace gauge with a cartridge installed for measurement.

Similar reference characters designate corresponding parts throughout the several figures of the drawings.

DESCRIPTION OF THE PREFERRED EMBODIMENT

Referring now to the drawings, the present invention will be understood to relate to an improved gauge for the precise measurement of firearm cartridge headspace. Gauge 10 is shown in its assembled form with cartridge 16 inserted therein in FIG. 2. Gauge 10 comprises two basic components, barrel 12 and head 14, fashioned in much the same manner as the standard micrometer barrel and vernier adjustment head.

Barrel 12, however, is precisely machined to accept a firearm cartridge 16 within its central cavity 18. Cavity 18 may be machined with various features in order to allow it to precisely match the shape of any given cartridge 16. The gauge 10 of FIG. 2 is shown with a smaller portion 20 which may accept the necked down portion 22 of cartridge 16, which is sized to accept the proper caliber of bullet, not shown. In the embodiment of FIGS. 1 and 2, central cavity 18 is fashioned with a conic portion 24 in order to precisely fit like portion 26 of cartridge 16, and larger diameter 28 in order to match remaining portion 30 of cartridge 16. Obviously, portions 20, 24, and 28 of central cavity 18 may be machined to fit the dimensions of any caliber and size cartridge 16 desired.

Barrel 12 contains a male threaded portion 32 which matches and threads into the corresponding female threaded portion 34 of head 14. Threaded portions 32 of barrel 12 and 34 of head 14 preferably have a pitch of 40 threads per inch in order to achieve an advance of 0.025 inch for each revolution of head 14 on barrel 12. Correspondingly, by placing 25 index marks 38 equally spaced around the circumference of head 14, headspace differences of only 0.001 inch in cartridge 16 may be measured. In order to determine the quantity of these small differences, barrel 12 is equipped with index marks 36 which correspond with vernier marks 38 of head 14. Such vernier marks may be equipped with a positive 40 or negative 42 indication in order to more easily determine whether the headspace of cartridge 16 is greater or less than optimum. Barrel 12 may also be marked with an indication 44 in order that the user may readily determine the proper caliber and type of gauge 10 he may require.

Gauge 10 may be used with cartridges 16 which have had the old primer 54 removed from the primer end 48 of cartridge 16, or after a new primer 54 has been inserted into the primer end 48 of cartridge 16. In some cases the new primer 54 may protrude slightly above the surface of the primer end 48 of the cartridge 16, which would preclude the accurate measurement of headspace of that given cartridge 16. In order to provide for this occurrence a hole 56 is provided in the top of head 14 of sufficiently large diameter to allow clearance from any primer 54 which may be installed in cartridge 16. In this manner accurate measurement of the headspace of cartridge 16 may be obtained in all cases. Head 14 may also be equipped with a knurled or otherwise roughened area 46 in order to provide the user with a better grip of head 14.

Gauge 10 may be used by removing head 14 from barrel 12, inserting cartridge 16 into central cavity 18 of barrel 12, and reinstalling head 14 onto barrel 12. When the proper gauge 10 is used with a given cartridge 16, components 22, 26 and 30 of cartridge 16 will conform precisely to the interior features 20, 24 and 28 of cavity 18 within barrel 12, which will place shoulder and primer end 48 of cartridge 16 at the desired distance from cartridge insertion end 50 of barrel 12. Head 14 may then be threaded onto barrel 12 until the upper interior portion 52 of head 14 contacts the primer end 48 of cartridge 16. By referring to the relationship between index marks 36 of barrel 12 and vernier marks 38 of head 14, the precise headspace of cartridge 16 may be determined and after removal from gauge 10 may be resized as necessary.

It is to be understood that the present invention is not limited to the sole embodiment described above, but encompasses any and all embodiments within the scope of the following claims.

I claim:

1. A firearm cartridge headspace gauge comprising;
   a hollow gauge barrel having a central axis,
   said barrel formed internally to conform precisely to the external physical dimensions of a given firearm cartridge caliber and type,
   a barrel head sharing said central axis, said barrel head contains an internally threaded portion formed to precisely match and secure to an externally threaded portion of said gauge barrel,
   said barrel and said barrel head contain external means indicating headspace of a cartridge contained therein, said external indicating means comprises a vernier scale in the manner of a micrometer scale disposed about the periphery of said barrel and said barrel head.

2. A firearm cartridge headspace gauge according to claim 1 wherein;
   said gauge contains means identifying the type of cartridge for which said gauge is intended.

3. A firearm cartridge headspace gauge according to claim 1 wherein;
   said barrel head contains a hole providing clearance for any primer which may be protruding from said cartridge contained within said gauge.

* * * * *